US012782750B2

(12) United States Patent
Hsu et al.

(10) Patent No.: US 12,782,750 B2
(45) Date of Patent: Nov. 3, 2026

(54) FLOATING IMAGE GENERATION DEVICE

(71) Applicant: Darwin Precisions Corporation, Hsinchu County (TW)

(72) Inventors: Chih-Ping Hsu, Hsinchu County (TW); Ya Han Ko, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 602 days.

(21) Appl. No.: 18/126,021

(22) Filed: Mar. 24, 2023

(65) Prior Publication Data

US 2023/0333404 A1 Oct. 19, 2023

(30) Foreign Application Priority Data

Apr. 14, 2022 (TW) ................................ 111114296

(51) Int. Cl.
*G02B 30/50* (2020.01)
*G02B 30/56* (2020.01)

(52) U.S. Cl.
CPC .................................... *G02B 30/56* (2020.01)

(58) Field of Classification Search
CPC ...................................................... G02B 30/56
See application file for complete search history.

(56) References Cited

U.S. PATENT DOCUMENTS 5,771,328 A * 6/1998 Wortman ............. G02B 6/0053 359/837
2006/0050197 A1 3/2006 Hu et al.
2006/0114569 A1* 6/2006 Capaldo ............... G02B 6/0053 359/619

(Continued)

FOREIGN PATENT DOCUMENTS

CN 1727947 A 2/2006
CN 112799237 A 5/2021

(Continued)

OTHER PUBLICATIONS

CNIPA "Office Action" issued on Jan. 20, 2025, China.

*Primary Examiner* — Bumsuk Won
*Assistant Examiner* — John C Sipes
(74) *Attorney, Agent, or Firm* — WPAT, PC

(57) ABSTRACT

A floating image generation device is disclosed. The floating image generation device includes a light source, an image generating module, and an image angle adjusting unit. The image generating module is disposed parallelly on one side of the light source and includes an image forming unit and a floating image generation unit. The floating image generation unit is disposed parallelly on the other side of the image forming unit with respect to the light source. The image angle adjusting unit is disposed parallelly on the other side of the image generating module with respect to the light source, wherein there is a gap between the image angle adjusting unit and the image generating module. A light emitted by the light source passes through the image generating module and the image angle adjusting unit to generate a floating image. There is an image deflection angle between the normal line of the light source and the path of the light emitted by the light source after passing through the image generating module and the image angle adjusting unit.

9 Claims, 5 Drawing Sheets

(56) References Cited

U.S. PATENT DOCUMENTS

| | | | | |
|---|---|---|---|---|
| 2008/0020299 | A1* | 1/2008 | Lee | G02B 3/0012 430/5 |
| 2008/0291269 | A1* | 11/2008 | Hong | H04N 13/354 348/E13.001 |
| 2009/0190096 | A1* | 7/2009 | Chen | H04N 13/305 353/7 |
| 2010/0271721 | A1* | 10/2010 | Gaides | G02B 5/045 359/885 |
| 2013/0182155 | A1* | 7/2013 | Egawa | H10F 39/8063 348/294 |
| 2017/0261650 | A1* | 9/2017 | Powell | G02B 3/0062 |
| 2017/0261729 | A1* | 9/2017 | Powell | G02B 17/08 |
| 2018/0124381 | A1* | 5/2018 | Chen | H04N 13/207 |
| 2021/0342031 | A1 | 11/2021 | Huang | |
| 2022/0335745 | A1 | 10/2022 | Lai et al. | |
| 2025/0093679 | A1 | 3/2025 | Qiao et al. | |

FOREIGN PATENT DOCUMENTS

| | | | |
|---|---|---|---|
| CN | 113625901 | A | 11/2021 |
| TW | 201743111 | A | 12/2017 |
| TW | 202001344 | A | 1/2020 |
| TW | 202142926 | A | 11/2021 |
| TW | I777808 | B | 9/2022 |
| WO | WO2016175378 | A1 | 11/2016 |

* cited by examiner

FLOATING IMAGE GENERATION DEVICE

CROSS-REFERENCE TO RELATED APPLICATION

This application claims the priority benefit of Taiwan application serial no. 111114296 filed on Apr. 14, 2022. The entirety of the above-mentioned patent applications is hereby incorporated by reference herein and made a part of this specification.

BACKGROUND

Technical Field

The present disclosure relates to a floating image generation device and an electronic device.

Related Art

With the progress of the technology, display techniques continuously evolve to satisfy users' requirement of greater visual experience. In the field of three-dimensional display techniques, 3D glasses and naked-eye 3D display techniques are commonly used. With naked-eye 3D display technique, users can see 3D images directly without wearing any device. With 3D display technique using glasses, users have to see 3D image by wearing glasses having polarized lens, shutter lens, etc. Naked-eye 3D display technique is popular among customers due to its convenience and comfort, wherein floating image generation technique attracts customer's attention especially. One feature of floating image generation technique is the capability to project floating images in space, wherein floating images not only can be seen but also can have interaction with customers at close range.

However, as shown in FIG. 1, for conventional floating image generation devices, the displayed floating images are often located in the range which is straight ahead of the light source 10. In other words, if the eyes of a user are located in a range which is not straight ahead of the light source 10, the user might not be able to see the floating images clearly. As such, conventional floating image generation devices are still improvable.

SUMMARY

One of objectives of the present disclosure is to provide a floating image generation device, capable of displaying floating images located outside the range straight ahead and providing better user's experience.

The floating image generation device of the present disclosure includes a light source, an image generating module, and an image angle adjusting unit. The image generating module is disposed parallelly on one side of the light source, wherein the image generating module includes an image forming unit and a floating image generation unit. The floating image generation unit is disposed parallelly on the other side of the image forming unit with respect to the light source. The image angle adjusting unit is disposed parallelly on the other side of the image generating module with respect to the light source, wherein a gap exists between the image angle adjusting unit and the image generating module. A light emitted by the light source passes through the image generating module and the image angle adjusting unit to generate a floating image. There is an image deflection angle between the normal line of the light source and the path of the light emitted by the light source after the light emitted by the light source passes through the image generating module and the image angle adjusting unit.

In one embodiment, the floating image generation device of the present disclosure includes a light source, an image generating module, and an image angle adjusting unit. The image generating module disposed on one side of the light source, wherein the image generating module includes an image forming unit and a floating image generation unit. The floating image generation unit is disposed parallelly on the other side of the image forming unit with respect to the light source. The image angle adjusting unit connects to the image generating module to create an elevation angle between the image generating module and the light source.

DETAILED DESCRIPTION

Figure 1:
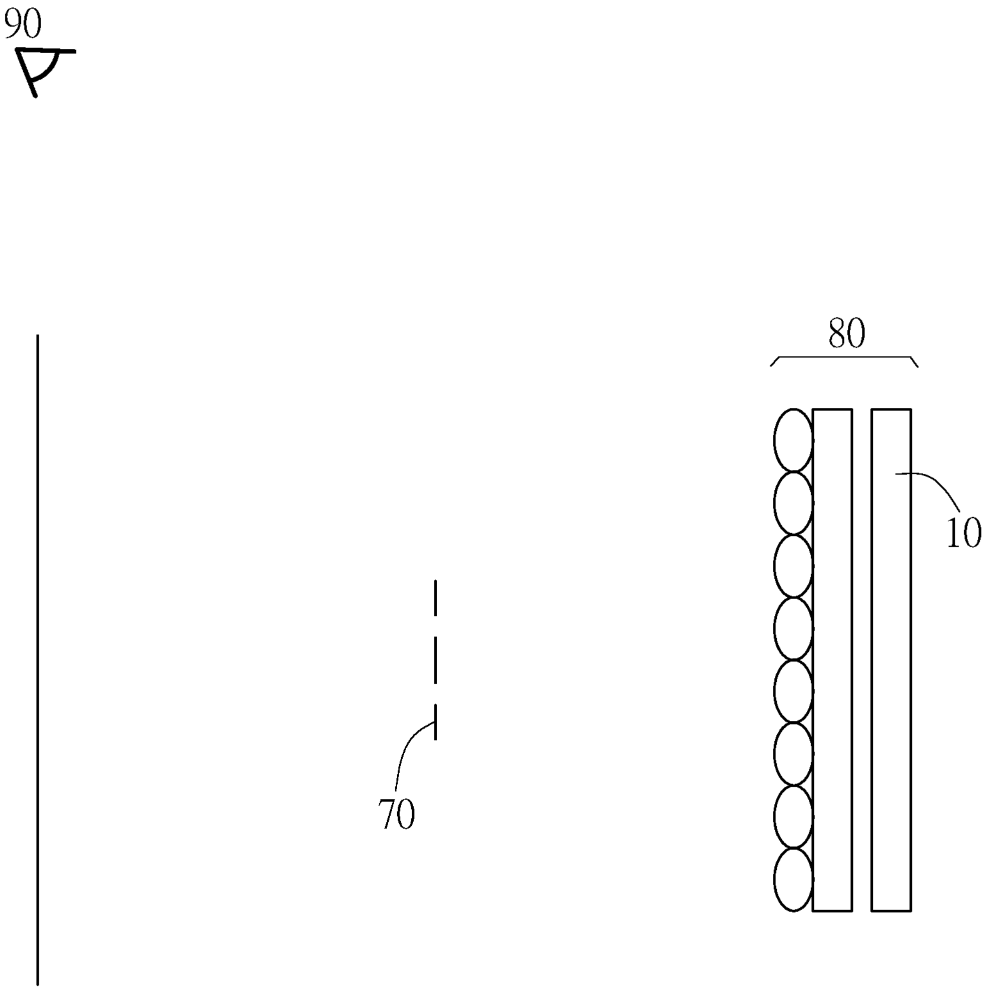
FIG. 1 (PRIOR ART)
FIG. 1 is a schematic diagram of a conventional floating image generation device.

Implementations of a connection assembly disclosed by the present disclosure are described below by using particular and specific embodiments with reference to the drawings, and a person skilled in the art may learn of advantages and effects of the present disclosure from the disclosure of this specification. However, the following disclosure is not intended to limit the protection scope of the present disclosure, and a person skilled in the art may carry out the present disclosure by using other different embodiments based on different viewpoints without departing from the concept and spirit of the present disclosure. In the accompanying drawings, plate thicknesses of layers, films, panels, regions, and the like are enlarged for clarity. Throughout the specification, same reference numerals indicate same elements. It should be understood that when an element such as a layer, film, region or substrate is referred to as being "on" or "connected" to another element, it may be directly on or connected to the another element, or intervening elements may also be present. In contrast, when an element is referred to as being "directly on" or "directly connected to" another element, there is no intervening element present. As used herein, "connection" may refer to a physical and/or electrical connection. Further, "electrical connecting" or "coupling" may indicate that another element exists between two elements.

It should be noted that the terms "first", "second", "third", and the like that are used in the present disclosure can be used for describing various elements, components, regions, layers and/or portions, but the elements, components, regions, layers and/or portions are not limited by the terms.

The terms are merely used to distinguish one element, component, region, layer, or portion from another element, component, region, layer, or portion. Therefore, the "first element", "component", "region", "layer", or "portion" discussed below may be referred to as a second element, component, region, layer, or portion without departing from the teaching of this disclosure.

In addition, relative terms, such as "down" or "bottom" and "up" or "top", are used to describe a relationship between an element and another element, as shown in the figures. It should be understood that the relative terms are intended to include different orientations of a device in addition to orientations shown in the figures. For example, if a device in a figure is turned over, an element that is described to be on a "lower" side of another element is directed to be on an "upper" side another element. Therefore, the exemplary terms "down" may include orientations of "down" and "up" and depends on a particular orientation of an accompanying drawing. Similarly, if a device in a figure is turned over, an element that is described as an element "below" another element or an element "below" is directed to be "above" another element. Therefore, the exemplary terms "below" or "below" may include orientations of up and down.

As used herein, "about", "approximately", or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Further, as used herein, "about", "approximately", or "substantially" may depend on optical properties, etch properties, or other properties to select a more acceptable range of deviations or standard deviations without one standard deviation for all properties.

Figure 2:
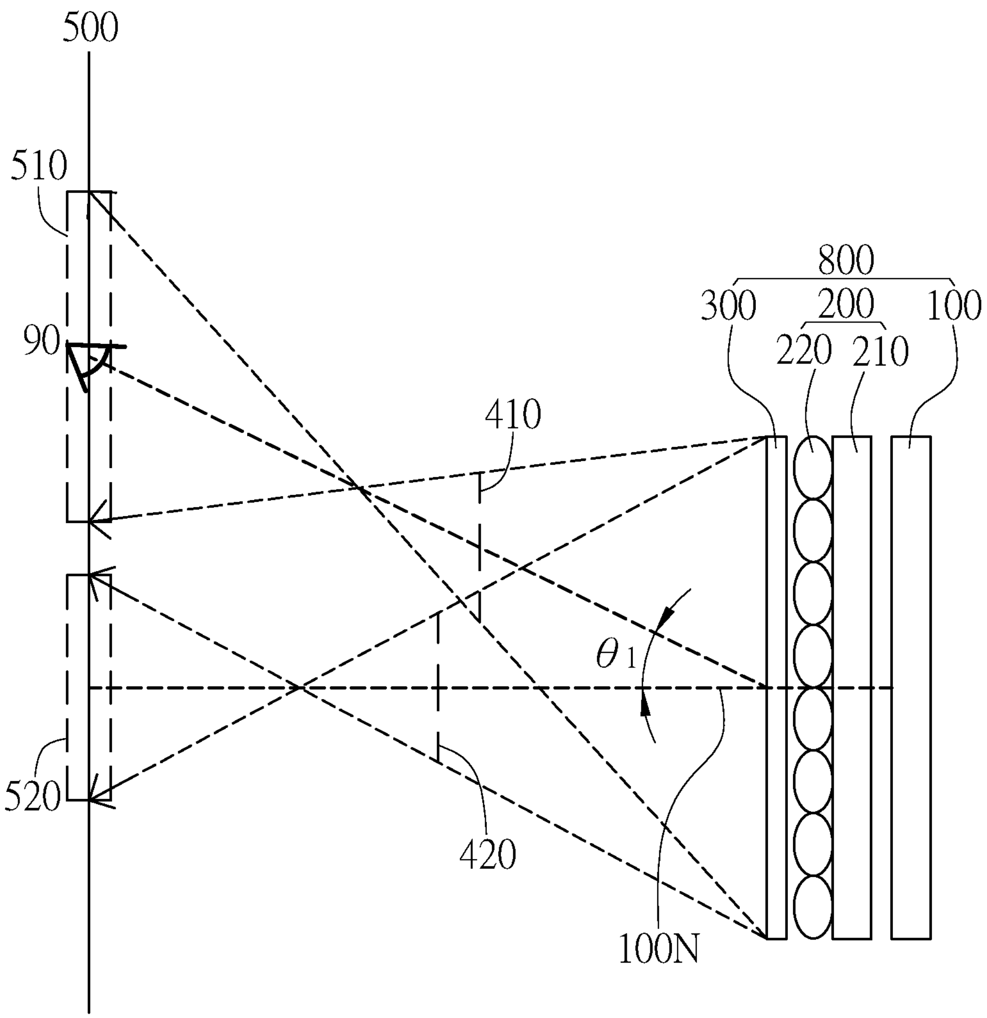
FIG. 2 is a schematic diagram of an embodiment of a floating image generation device according to the present disclosure.

As shown in the embodiment in FIG. 2, the floating image generation device 800 of the present disclosure includes a light source 100, an image generating module 200, and an image angle adjusting unit 300. More particularly, the floating image generation device 800 is capable of displaying a floating image 410 on the side of the image angle adjusting unit 300 opposite to the light source 100. The light source 100 can be a point light source such as an LED or a diffused/homogenized planar light source.

As shown in the embodiment in FIG. 2, the image generating module 200 is disposed parallelly on one side of the light source 100, wherein the image generating module 200 includes an image forming unit 210 and a floating image generation unit 220. The image forming unit 220 contains the pattern of the desired floating image to be generated. More particularly, the pattern on the first image forming unit 210 can block light. In different embodiments, the first image forming unit 210 can be a negative film or a mask having fixed patterns, or a liquid crystal layer having changeable patterns. The floating image generation unit 220 is disposed parallelly on the side of the image forming unit 210 opposite to the light source 100. In an embodiment, the floating image generation unit 220 can be a micro-lens array, which can include single-side or dual-side converging lens structures and can be formed by processes such as UV-imprinting, injection, heat-pressing, etc.

As shown in the embodiment in FIG. 2, the image angle adjusting unit 300 is disposed parallelly on the side of the image generating module 200 opposite to the light source 100, wherein a gap exists between the image angle adjusting unit 300 and the image generating module 200. In other words, in an embodiment, air exists between the image angle adjusting unit 300 and the floating image generation unit 220. A light emitted by the light source 100 passes through the image generating module 200 and the image angle adjusting unit 300 to generate a floating image 410. There is an image deflection angle $\theta_1$ between the normal line 100N of the light source 100 and the path of the light emitted by the light source 100 after the light emitted by the light source 100 passes through the image generating module 200 and the image angle adjusting unit 300. In an embodiment, the light emitted by the light source 100 is parallel to the normal line 100N of the light source 100.

Figure 3A:
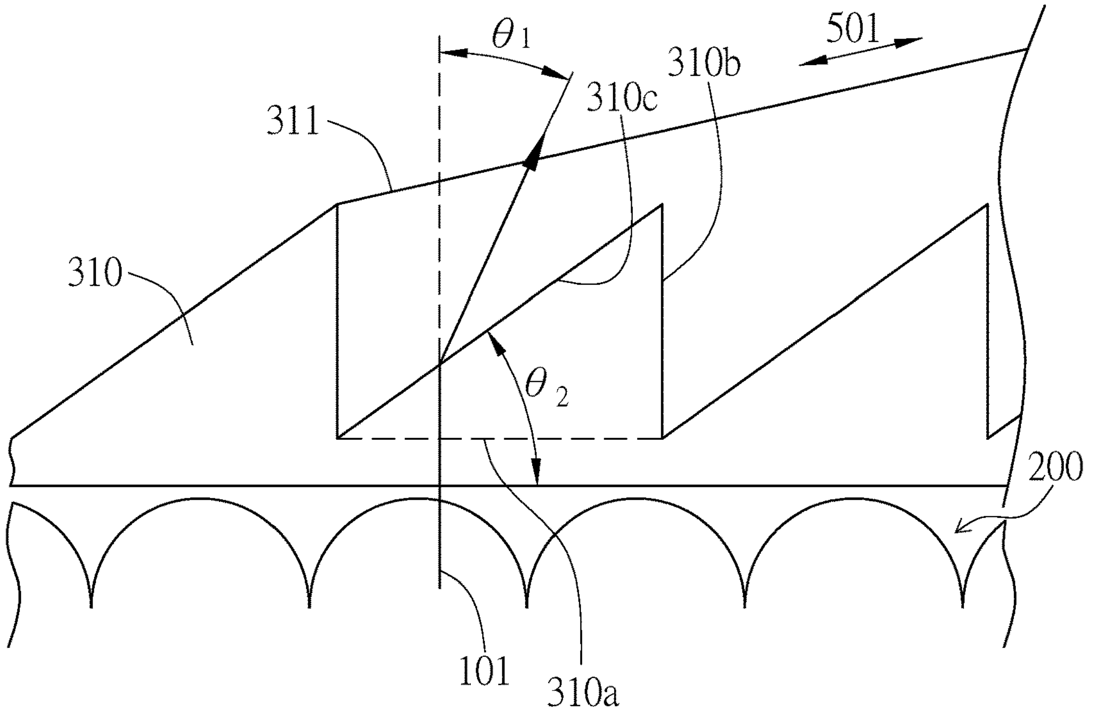
FIG. 3A is a schematic diagram of an embodiment of an image angle adjusting unit in a floating image generation device according to the present disclosure.

More particularly, the image angle adjusting unit 300 includes an optical film. As shown in the embodiment in FIG. 3A, the image angle adjusting unit 300 includes a plurality of prism strips 310 extending along a first direction 501 and protruding in the opposite direction from the image generating module 200, wherein the prism strip 310 has a ridgeline 311 (i.e., the topmost edge along a prism strip ridge). The shape of the cross-section of the prism strip 310 perpendicular to the first direction 501 is an orthogonal triangle. Two sides, 310*a* and 310*b*, of the right angle of the orthogonal triangle are respectively parallel and perpendicular to the face of the image angle adjusting unit 300 facing the image generating module 200. There is a prism bottom angle $\theta_2$ between the hypotenuse 310*c* and the face of the image angle adjusting unit 300 facing the image generating module 200. A light 101 emitted by the light source 100 deflects with the image deflection angle $\theta_1$ after passing through the image generating module 200 and the image angle adjusting unit 300, wherein:

$$\theta_1 = \left(\sin^{-1}\frac{n_2}{n_1}\sin\theta_2\right) - \theta_2,$$

wherein $n_1$ is the refractive index outside the prism strip 310 (air in an embodiment) and $n_2$ is the refractive index of the prism strip. In an embodiment, $\theta_1$ is about 0-45°, $\theta_2$ is about 0-45°, $n_1<n_2$, and $n_2$ is 1.5±10%. Specifically, $\theta_1$ is about 18°, $\theta_2$ is 30°, $n_1$ is 1, and $n_2$ is 1.49.

Taking a different point of view, as shown in the embodiment in FIG. 2, the light emitted by the light source 100 passes through the image generating module 200 and the image angle adjusting unit 300 to generate the floating image 410, wherein the floating image 410 corresponds to a watching range 510 of a watching plane 500 which the user's eyes are on. By contrast, in prior arts where no image angle adjusting unit 300 exists, the light emitted by the light source 100 generates a floating image 420, wherein the floating image 420 corresponds to a watching range 520 of a watching plane 500. The watching range 510 and the watching range 520 at least partially don't overlap. From a different viewpoint, the vertical projection range of the light source 100 on the watching plane 500 and the watching range 510 on the watching plane 500 at least partially don't overlap.

Accordingly, the floating image generation device 800 of the present disclosure is capable of displaying floating images located outside the range straight ahead the light source 100, and allows the user to see complete floating images outside the range straight ahead the light source 100. Hence, better user's experience is provided.

Figure 3B:
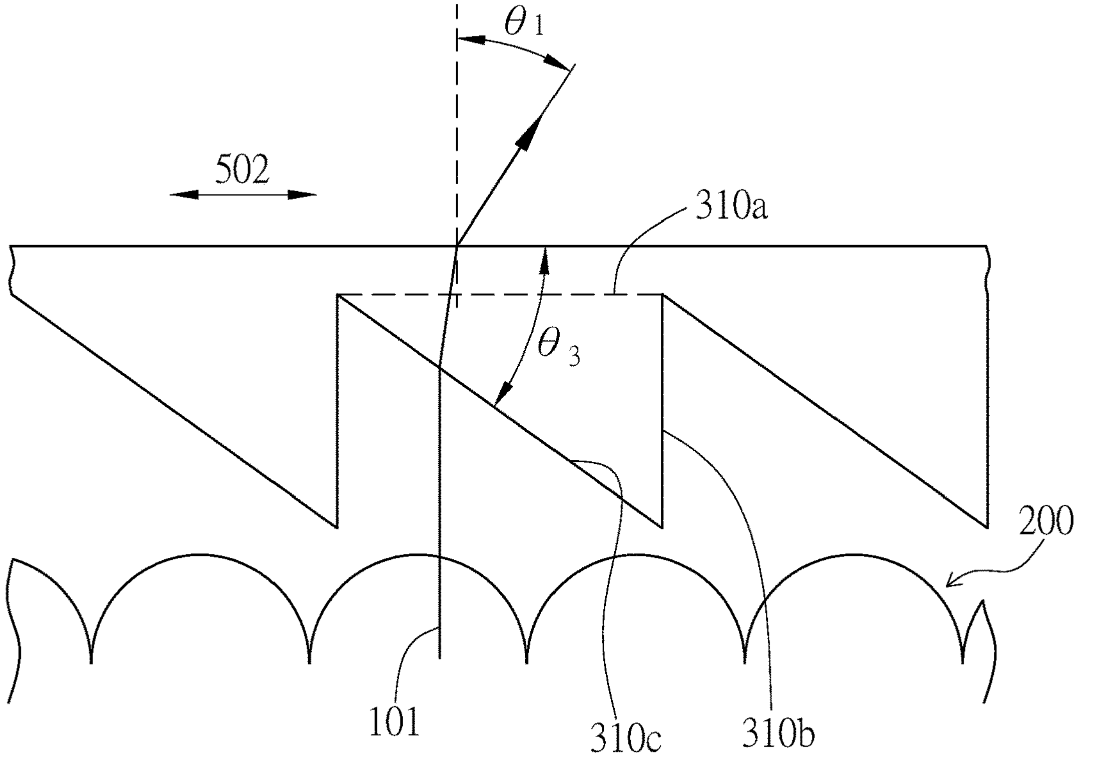
FIG. 3B is a schematic diagram of different embodiment of an image angle adjusting unit in a floating image generation device according to the present disclosure.

The image angle adjusting unit 300 could be modified according to the manufacturing, design, and usage requirements. As shown in a different embodiment in FIG. 3B, the image angle adjusting unit 300 includes a plurality of prism strips 310 protruding towards the image generating module 200. The shape of the cross-section of the prism strip 310 perpendicular to the first direction 501 is an orthogonal triangle, wherein two sides, 310*a* and 310*b*, of the right angle of the orthogonal triangle are respectively parallel and perpendicular to the face of the image angle adjusting unit 300 opposite to the image generating module 200. There is a prism bottom angle $\theta_3$ between the hypotenuse 310*c* and the face of the image angle adjusting unit 300 opposite to the image generating module 200. A light 101 emitted by the light source 100 deflects with the image deflection angle $\theta_3$ after passing through the image generating module 200 and the image angle adjusting unit 300, wherein:

$$\theta_1 = \left(\sin^{-1}\frac{n_2}{n_1}\sin\left(\theta_3 - \sin^{-1}\frac{n_2}{n_1}\sin\theta_3\right)\right),$$

wherein $n_1$ is the refractive index outside the prism strip 310 (air in an embodiment) and $n_2$ is the refractive index of the prism strip. In an embodiment, $\theta_1$ is about 0-45°, $\theta_3$ is about 0-45°, $n_1<n_2$, and $n_2$ is 1.5±10%. Specifically, $\theta_1$ is about 19.6°, $\theta_3$ is 30°, $n_1$ is 1, and $n_2$ is 1.49.

Figure 4:
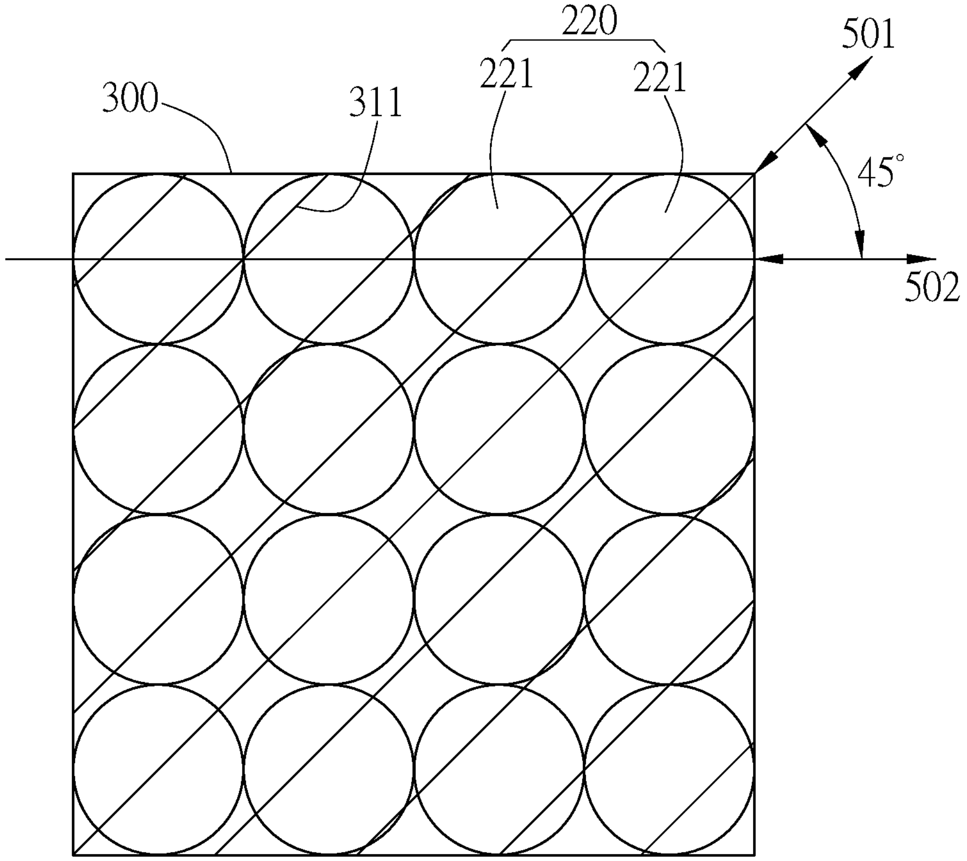
FIG. 4 is a schematic diagram of an embodiment of the prism strips and the micro-lens arrays in a floating image generation device according to the present disclosure.

In different embodiments, the deflection direction of the floating image may be controlled by adjusting the relative angle between the optical structures of the image angle adjusting unit 300 and the floating image generation unit 220. More particularly, as shown in the embodiment in FIG. 4, the ridgeline 311 of the prism strip 310 extends along the first direction 501. The floating image generation unit 220 includes a plurality of micro-lens arrays 221 disposed along a second direction 502, wherein the angle between the first direction 501 and the second direction 502 is 45°. Accordingly, the deflection direction of the floating image is not limited to the up, down, left, and right directions while facing the light source. Hence, the user's experience may be enhanced further.

Figure 5:
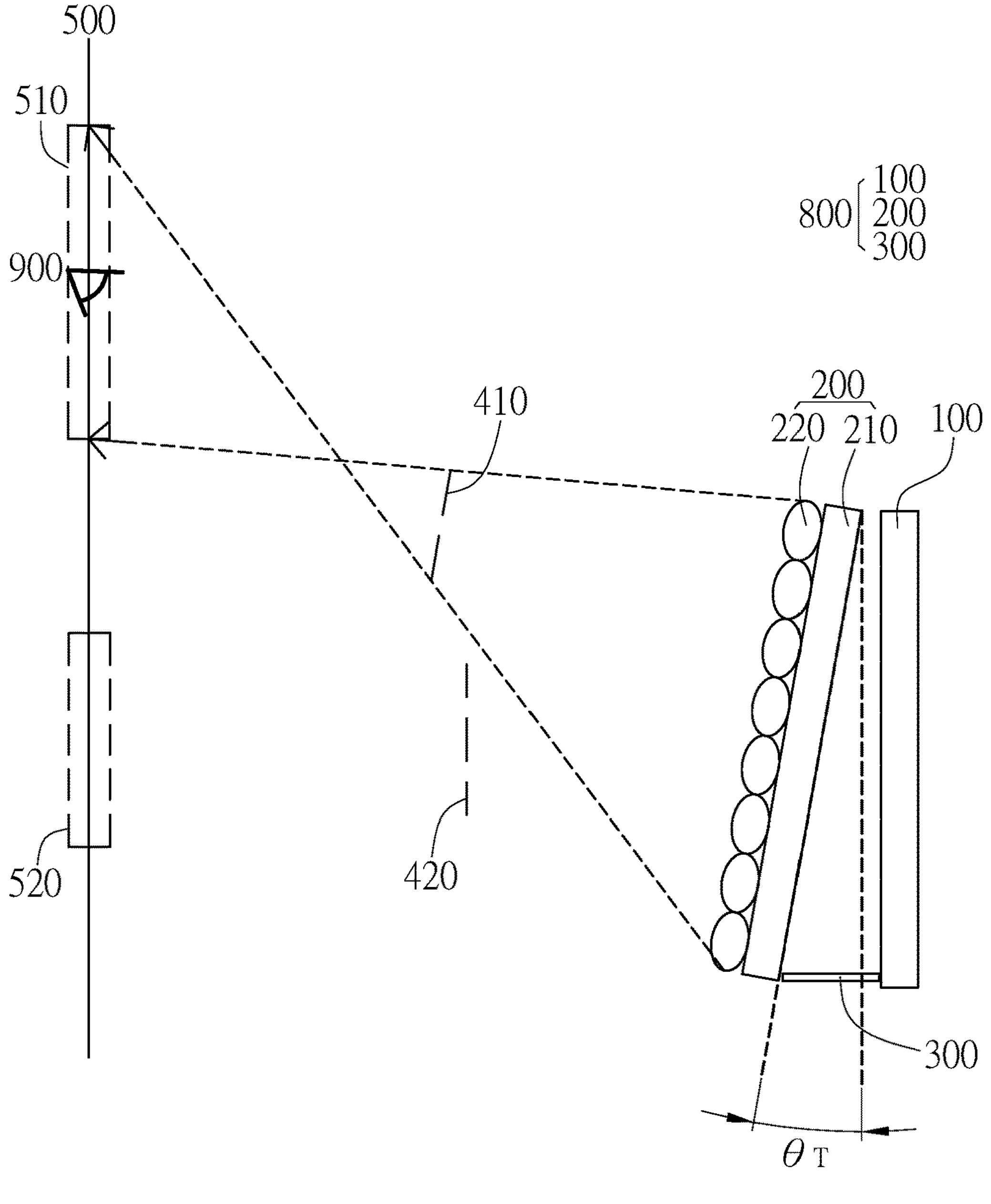
FIG. 5 is a schematic diagram of different embodiment of a floating image generation device according to the present disclosure.

The image angle adjusting unit 300 is not limited to an optical film. As shown in a different embodiment in FIG. 5, the image angle adjusting unit 300 connects to the image generating module 200 to create an elevation angle $\theta_T$ between the image generating module 200 and the light source 100. The image angle adjusting unit 300 includes a supporting unit, e.g., a frame or a pillar having supporting function, capable of lifting a portion of the image generating module 200 with respect to the light source 100 to have the elevation angle $\theta_T$. More particularly, the light emitted by the light source 100 passes through the image generating module 200 having the elevation angle $\theta_T$ to generate the floating image 410, wherein the floating image 410 corresponds to a watching range 510 of a watching plane 500 which the user's eyes are on. By contrast, in prior arts where no image angle adjusting unit 300 exists and the image generating module 200 is parallel to the light source 100, the light emitted by the light source 100 generates a floating image 420 corresponding to a watching range 520 of the watching plane 500. The watching range 510 and the watching range 520 at least partially don't overlap. In other words, in the present disclosure, the displaying position of the floating image may be adjusted by either having an optical film with light deflection effect as the image angle adjusting unit, or disposing structural elements capable of making the image generating module have an angle with respect to the light source, which allows the user to see complete floating images outside the range straight ahead of the light source 100.

The present disclosure is described by means of the above-described relevant embodiments. However, the above-described embodiments are only examples for implementing the present disclosure. It should be pointed out that the disclosed embodiments do not limit the scope of the present disclosure. In contrast, the spirit included in the scope of the patent application and modifications and equivalent settings made within the scope are all included in the scope of the present disclosure.

What is claimed is:

1. A floating image generation device, comprising:

a planar light source having a normal line;

an image generating module disposed parallelly on one side of the planar light source, wherein the image generating module includes:

an image forming unit; and a floating image generation unit disposed parallelly on the other side of the image forming unit with respect to the planar light source; and an image angle adjusting unit disposed parallelly on the other side of the image generating module with respect to the planar light source, wherein a gap exists between the image angle adjusting unit and the image generating module;

wherein a light emitted by the planar light source passes through the image generating module and the image angle adjusting unit to generate a floating image deflected from the normal line of the planar light source, wherein there is an image deflection angle between the normal line of the planar light source and the path of the light emitted by the planar light source after the light emitted by the planar light source passes through the image generating module and the image angle adjusting unit.

2. The floating image generation device according to claim 1, wherein the image angle adjusting unit includes an optical film.

3. The floating image generation device according to claim 2, wherein the image angle adjusting unit includes a plurality of prism strips extending along a first direction and protruding in the opposite direction from the image generating module, the shape of the cross- section of the prism strip perpendicular to the first direction is an orthogonal triangle, wherein two sides of the right angle of the orthogonal triangle are respectively parallel and perpendicular to a face of the image angle adjusting unit facing the image generating module, wherein there is a prism bottom angle between the hypotenuse and the face of the image angle adjusting unit facing the image generating module, wherein:

$$\theta_1 = \left(\sin^{-1}\frac{n_2}{n_1}\sin\theta_2\right) - \theta_2$$

$\theta_1$ is the image deflection angle, $\theta_2$ is the prism bottom angle, $n_1$ is the refractive index outside the prism strip, $n_2$ is the refractive index of the prism strip.

4. The floating image generation device according to claim 3, wherein $\theta_1$ is about 0-45°, $\theta_2$ is about 0-45°, $n_1 < n_2$, $n_2$ is 1.5±10%.

5. The floating image generation device according to claim 3, wherein the floating image generation unit includes a plurality of micro-lens arrays disposed along a second direction, wherein the angle between the first direction and the second direction is 45°.

6. The floating image generation device according to claim 2, wherein the image angle adjusting unit includes a plurality of prism strips extending along a first direction and protruding toward the image generating module, the shape of the cross-section of the prism strip perpendicular to the first direction is an orthogonal triangle, wherein two sides of the right angle of the orthogonal triangle are respectively parallel and perpendicular to a face of the image angle adjusting unit opposite to the image generating module, wherein there is a prism bottom angle between the hypotenuse and the face of the image angle adjusting unit facing the image generating module, wherein:

$$\theta_1 = \left(\sin^{-1}\frac{n_2}{n_1}\sin\left(\theta_3 - \sin^{-1}\frac{n_2}{n_1}\sin\theta_3\right)\right)$$

$\theta_1$ is the image deflection angle, $\theta_3$ is the prism bottom angle, $n_1$ is the refractive index outside the prism strip, $n_2$ is the refractive index of the prism strip.

7. The floating image generation device according to claim 6, wherein the transflective layer is disposed on one face of the floating image generation unit corresponding to a first image forming unit.

8. The floating image generation device according to claim 6, wherein the floating image generation unit includes a plurality of micro-lens arrays disposed along a second direction, wherein the angle between the first direction and the second direction is 45°.

9. The floating image generation device according to claim 1, wherein the vertical projection range of the planar light source on a watching plane and a watching range on the watching plane at least partially don't overlap.

* * * * *